(No Model.) 2 Sheets—Sheet 1.

J. WARRINGTON.
HOMINY MILL.

No. 544,145. Patented Aug. 6, 1895.

WITNESSES:
H. D. Nealy.
J. A. Walsh.

INVENTOR
Jesse Warrington,
BY
Chester Bradford,
ATTORNEY.

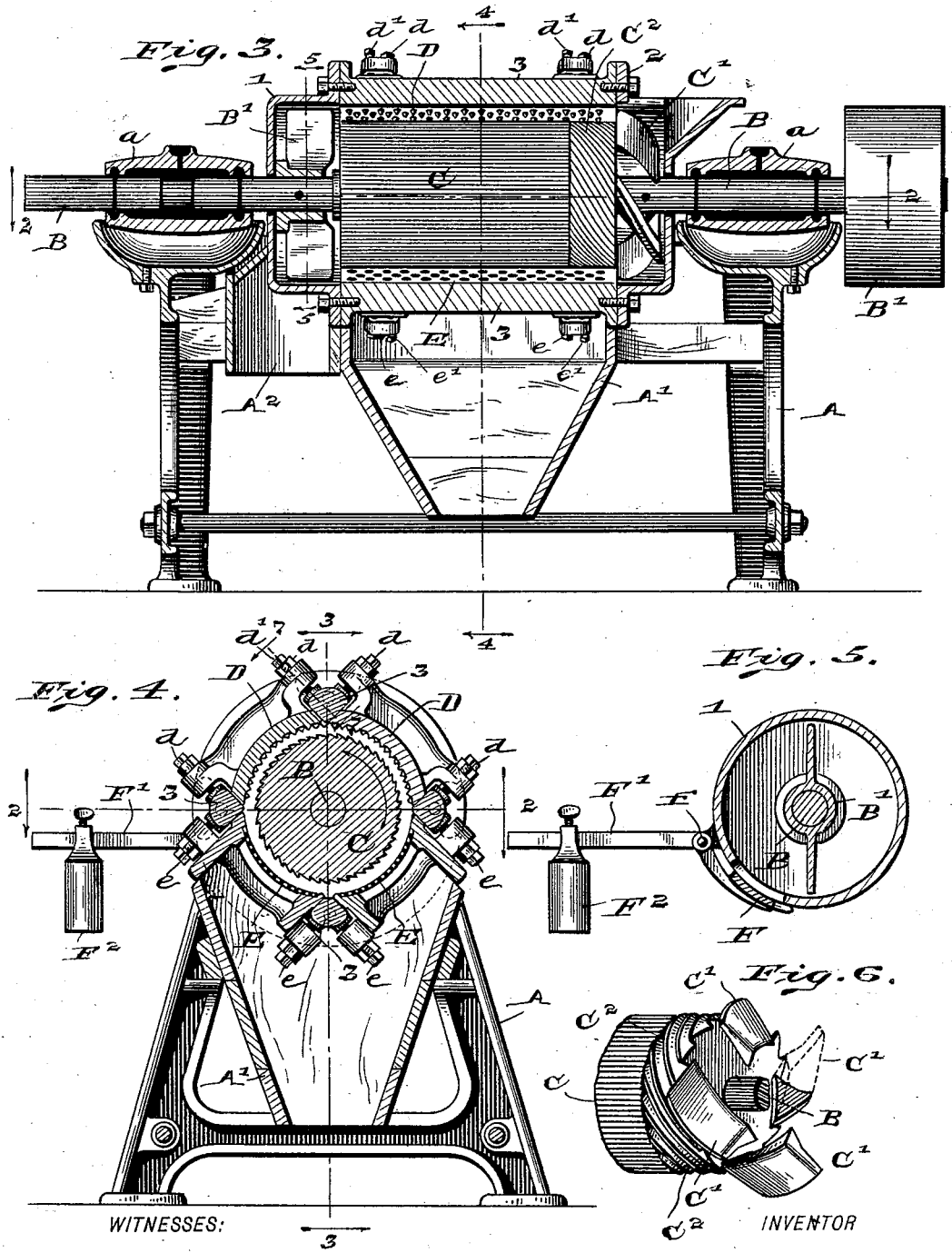

UNITED STATES PATENT OFFICE.

JESSE WARRINGTON, OF INDIANAPOLIS, INDIANA, ASSIGNOR OF ONE-HALF TO THE NORDYKE & MARMON COMPANY, OF SAME PLACE.

HOMINY-MILL.

SPECIFICATION forming part of Letters Patent No. 544,145, dated August 6, 1895.

Application filed December 24, 1894. Serial No. 532,857. (No model.)

*To all whom it may concern:*

Be it known that I, JESSE WARRINGTON, a citizen of the United States, residing at Indianapolis, in the county of Marion and State of Indiana, have invented certain new and useful Improvements in Hominy-Mills, of which the following is a specification.

The object of my said invention is to produce a hominy-mill which shall be simple in construction, efficient in operation, and easily adjusted to perform varying grades of work. Such a mill embodying my improvements will be first fully described, and the novel features thereof then pointed out in the claims.

Figure 1:
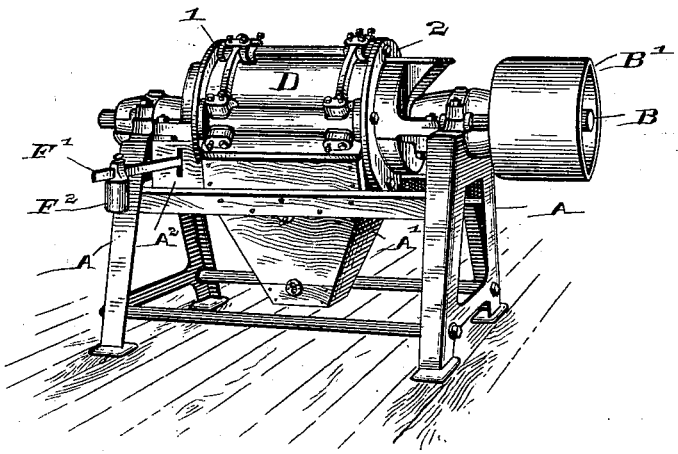
Figure 2:
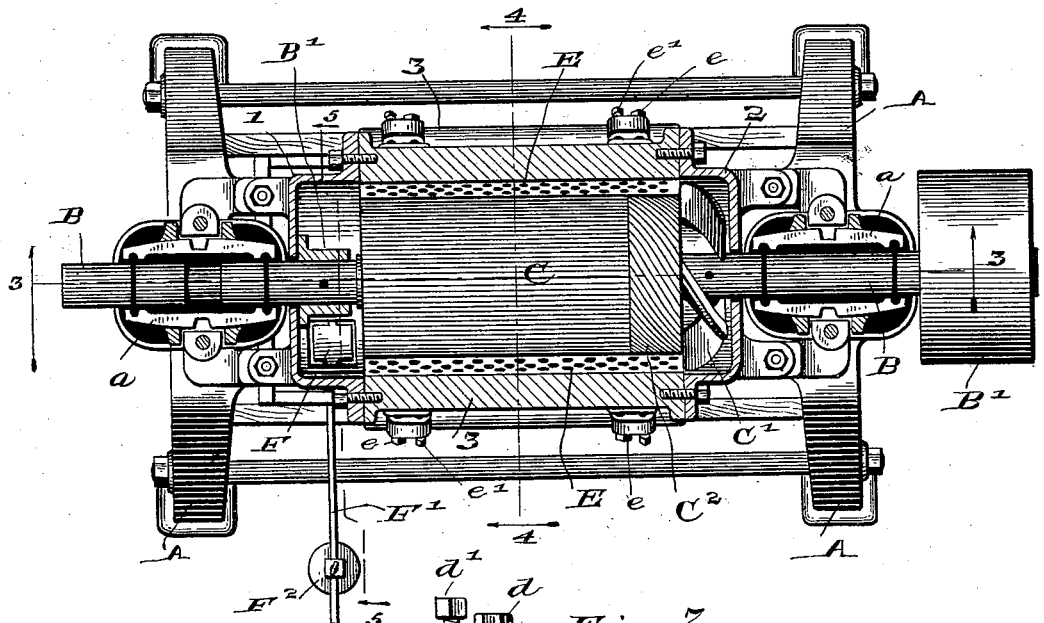
Figure 7:
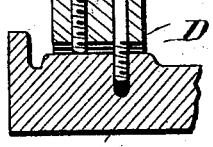

Referring to the accompanying drawings, which are made a part hereof, and on which similar letters and numerals of reference indicate similar parts, Figure 1 is a perspective view of a hominy-mill embodying my said invention; Fig. 2, a horizontal sectional view through the framework, showing most of the mechanism in plan, as seen when looking downwardly from the dotted line 2 2 in Fig. 4; Fig. 3, a longitudinal vertical sectional view on the dotted line 3 3 in Figs. 2 and 4; Fig. 4, a transverse sectional view on the dotted line 4 4 in Fig. 3; Fig. 5, a detail sectional view on the dotted line 5 5 in Fig. 3; Fig. 6, a detail perspective view of the feeding devices separately, and Fig. 7 a detail sectional view illustrating the method of connecting the adjustable parts of the cylinder to the fixed parts.

In said drawings the portions marked A represent the framework of the machine; B, the shaft thereof; C, the grinding-roll; D, the grinding-plates; E, perforated plates arranged similarly to the grinding-plates, and F the gate through which the finished product is discharged.

As shown, the frame A is of a suitable size and construction for the purpose and is provided with the bearings $a$ for the shaft B. The skeleton of the grinding-cylinder is also supported thereby, said skeleton consisting of the heads 1 and 2, having brackets or like supports extending out onto the frame, as shown in Fig. 2, and longitudinal bars 3, extending between said heads. Within the framework is secured the hopper A', which receives the hulls and fine particles separate from the finished product, and at one end is the discharge-spout A², into which the gate F opens for the finished product.

The shaft B is an ordinary shaft and is driven by a belt running from some suitable source of power (not shown) to the pulley B' thereon.

The grinding-roll C is fixedly mounted on the shaft B and is driven thereby. While I have denominated it briefly as a "grinding-roll," its office, in connection with the surrounding cylinder, is rather to decorticate and disintegrate the kernels, and this may be understood throughout the specification and claims. Said roll is shown as grooved or corrugated, and the roll proper, or that portion which does the grinding, preferably has its corrugations straight or approximately straight. This is so that the grinding, when the machine is filled with stock, shall be under substantially equal pressure throughout the length of the grinding-roll.

At the hopper end of the machine feeding devices are provided, and they may be connected to or integral with the grinding-roll. These I have shown as consisting of spirally-set wings C' and a section C², in which the grooves or corrugations are spiral instead of straight or approximately straight. In operation the stock being fed into the hopper is forced by these wings C' and the spiral corrugations on the part C² through the machine between the grinding-roll C and the surrounding cylinder. In a mill of this character the stock in order to produce the best results should be packed tightly into the grinding-space in the machine, so that there will be some positive pressure between the grinding-surfaces and the mass of stock, due to this packing, it being important that the hominy particles should be treated to some extent by the friction of the grains upon each other, as well as by that of the grinding-surfaces of the machine, the consequent rubbing or abrasion resulting in a better separation of the hull or bran and in a better quality of product. Where the grinding-roll has spiral grooves throughout its length, if the spirality is at all acute, when the stock is packed in, as has been described, the result is that the greater force is at that point which is near the discharging end of the machine, the spirality of the rolls tending to crowd the stock to this point, and thus there is an uneven grinding operation. It is necessary, however, that considerable force should be applied in order to produce the packing specified, and I have, therefore, provided the packing devices C' and C², as described; and experience has shown that these force the stock in to the required extent, while with the corrugations of the grinding-roll straight or approximately straight the packing tension is about the same throughout the length of the said grinding-roll, as I have proved by practical test.

The grinding-plates D in the construction shown form two or four concave plates, which surround the grinding-roll and form the cylinder within which such roll is contained. These plates are armed on their inner surfaces with small conical points, as shown in the drawings, and these aid the grinding-roll in its operation. Said plates are adjusted nearer to or farther from the grinding-roll by means of bolts $d$, which pass through wings on said plates and engage with screw-threaded perforations in the bars 3, and set-bolts $d'$ are also provided, as shown, for the purpose of limiting the adjustment.

The plates E are similar in arrangement to the plates D and are adjusted by the bolts $e$ $e'$ in a similar manner; but instead of being solid plates with conical points on their inner surfaces they are perforated plates, through the perforations whereof the bran and fine particles may escape and fall into the hopper A'. The construction is best shown in Fig. 4.

The plates D and E could as well be secured to the heads 1 and 2 as to the bars 3, if the overhanging projections on said plates were extended endwise instead of sidewise, as will be readily understood, the only requirement being that the plates shall be supported on some fixed part of the cylinder.

The gate F is mounted on a pivot $f$ and is provided with an arm F', extending beyond said pivot, upon which is an adjustable weight F². This arm-and-weight arrangement serves to keep the gate normally closed until forced open by the press of material inside the discharging end or head of the cylinder, as actuated by the wings on the hub B'. This device F, I have denominated a "gate;" but it does not close the discharging-orifice completely, as is best shown in Figs. 5 and 2, there being openings of sufficient size to permit the discharge of some portion of the finished product, which openings preferably extend nearly around said gate. The result is that when the grinding operation ceases the mass of finished product will not remain packed in the head at this discharging end, but will fall out through these openings or cracks, leaving the space it occupies when the machine is in operation comparatively empty, thus insuring that the machine shall not be clogged by holding the stock in its closely-packed condition, which, if permitted, makes the machine run too hard in starting again and results in many cases in throwing off the belt before the momentum of the machine can be attained, because, as will be readily understood, it is extremely difficult to communicate pressure through an inert mass sufficient to force open the gate F. These openings, however, when the gate is in its closed position, as shown in Fig. 5, while sufficient to permit the stock to be slowly discharged, are not sufficient for the discharge of the entire product of the mill in operation, and thus the benefit of said gate as a retarding device is secured, keeping the stock in its packed or closely-assembled condition during the operation of the machine. The force of the stock as impelled by the feeding devices presses against the gate and swings it open sufficient to permit the required discharge, the forces of the feeding devices and of the weight F² being thus opposed to each other. Said weight F² may be adjusted as desired, so that the discharge of the product is retarded to any predetermined extent, and this controls the pressure on the stock being acted on. If a free exit were provided when the machine was in operation, this packed condition would not be had and the result would be an imperfect product.

The head 2, as shown in Figs. 1 and 3, develops into a hopper, through which the material to be treated is introduced. Within said head are the feeding devices on the roll C, heretofore described, which serves to force the stock between the grinding-roll and the surrounding plates, and at the opposite end of the grinding-roll a winged hub B' is mounted on the shaft B and serves to force the treated stock through the discharging-gate.

Having thus fully described my said invention, what I claim as new, and desire to secure by Letters Patent, is—

1. The combination, in a hominy mill, of the frame-work having heads, and longitudinal bars extending between said heads, a grinding roll and its shaft, said shaft being mounted in bearings outside said heads, adjustable grinding plates located between said longitudinal bars above the grinding roll, adjustable sieving plates located between said longitudinal bars below said grinding roll, and bolts and set screws connected to projections from said plates and entering and bearing upon said longitudinal bars, said several parts being arranged and operating substantially as set forth.

2. The combination, in a hominy mill, of the frame-work, the longitudinally-corrugated grinding roll, the surrounding cylinder, the ingress hopper at one end, feeding devices within the hopper at the feeding end of the grinding roll consisting of spirally set wings C' and spirally-corrugated section C², a retarding discharge gate at the other end of the grinding roll, and a conveying or forcing device B' mounted on the shaft at that end of the roll, whereby the treated stock is forced through said retarding discharge gate, substantially as shown and described.

3. The combination, in a hominy mill, with the grinding roll having straight or approximately straight corrugations, and its surrounding cylinder, of feeding devices at the head or receiving end of said roll and extending out in line therewith consisting of spiral wings C', and a spirally-grooved cylindrical section C², said parts being constructed and operating substantially as shown and described.

4. The combination, in a hominy mill, with the frame-work, the grinding roll, and its surrounding cylinder, having a space at the discharging end of the roll to receive the finished stock, from which space a discharge orifice leads downwardly, and a retarding gate F supported on a pivot f beyond which the arm F' extends carrying the adjustable weight F², whereby the discharge of stock is held back to a predetermined pressure, substantially as and for the purposes set forth.

5. The combination, in a hominy mill, of the frame-work, the grinding roll, the surrounding cylinder to said roll, an ingress hopper at one end of said roll, a space within or at the bottom of said hopper at the end of said roll containing force feed devices, a space at the other end of said roll into which the treated stock may be discharged from the grinding roll, with an orifice therein, and a gate arranged over said orifice of a less size than said orifice whereby spaces are left for the discharge of stock independent of the position of said gate, an arm extending from said gate, and an adjustable weight on said arm, substantially as shown and described.

In witness whereof I have hereunto set my hand and seal, at Indianapolis, Indiana, this 15th day of December, A. D. 1894.

JESSE WARRINGTON. [L. S.]

Witnesses:
CHESTER BRADFORD,
JAMES A. WALSH.